US010716015B1

United States Patent
Marupaduga et al.

(10) Patent No.: US 10,716,015 B1
(45) Date of Patent: Jul. 14, 2020

(54) BROADCAST BEAM PROFILE ASSIGNMENT

(71) Applicant: Sprint Communications Company L.P., Overland Park, KS (US)

(72) Inventors: Sreekar Marupaduga, Overland Park, KS (US); Rajveen Narendran, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/505,126

(22) Filed: Jul. 8, 2019

(51) Int. Cl.
*H04W 16/28* (2009.01)
*H01Q 3/00* (2006.01)
*H01Q 3/30* (2006.01)
*H04B 7/0452* (2017.01)

(52) U.S. Cl.
CPC ............ *H04W 16/28* (2013.01); *H01Q 3/005* (2013.01); *H01Q 3/30* (2013.01); *H04B 7/0452* (2013.01)

(58) Field of Classification Search
CPC . H04W 64/00; H04W 52/0212; H04W 16/28; H04W 72/042
See application file for complete search history.

(56) References Cited

U.S. PATENT DOCUMENTS

| 2015/0094076 | A1* | 4/2015 | Inoue | H04W 16/28 455/452.1 |
| 2015/0372729 | A1* | 12/2015 | Tajima | H04B 7/0456 375/267 |
| 2018/0013476 | A1* | 1/2018 | Ramachandra | H04B 7/0617 |

\* cited by examiner

*Primary Examiner* — Keith Ferguson

(57) ABSTRACT

Methods and systems are provided for assigning a broadcast beam profile, which may include vertical and/or horizontal beam widths, to a particular cell site. In determining which broadcast beam profile to assign, an elevation and/or height associated with a cell site, an elevation of the user devices within the coverage area of the cell site, or a quantity of user devices above a predetermined elevation is considered. Based on this information, a broadcast beam profile is assigned to the cell site. At least one of a horizontal or vertical beam width is then adjusted based on the broadcast beam profile.

19 Claims, 5 Drawing Sheets

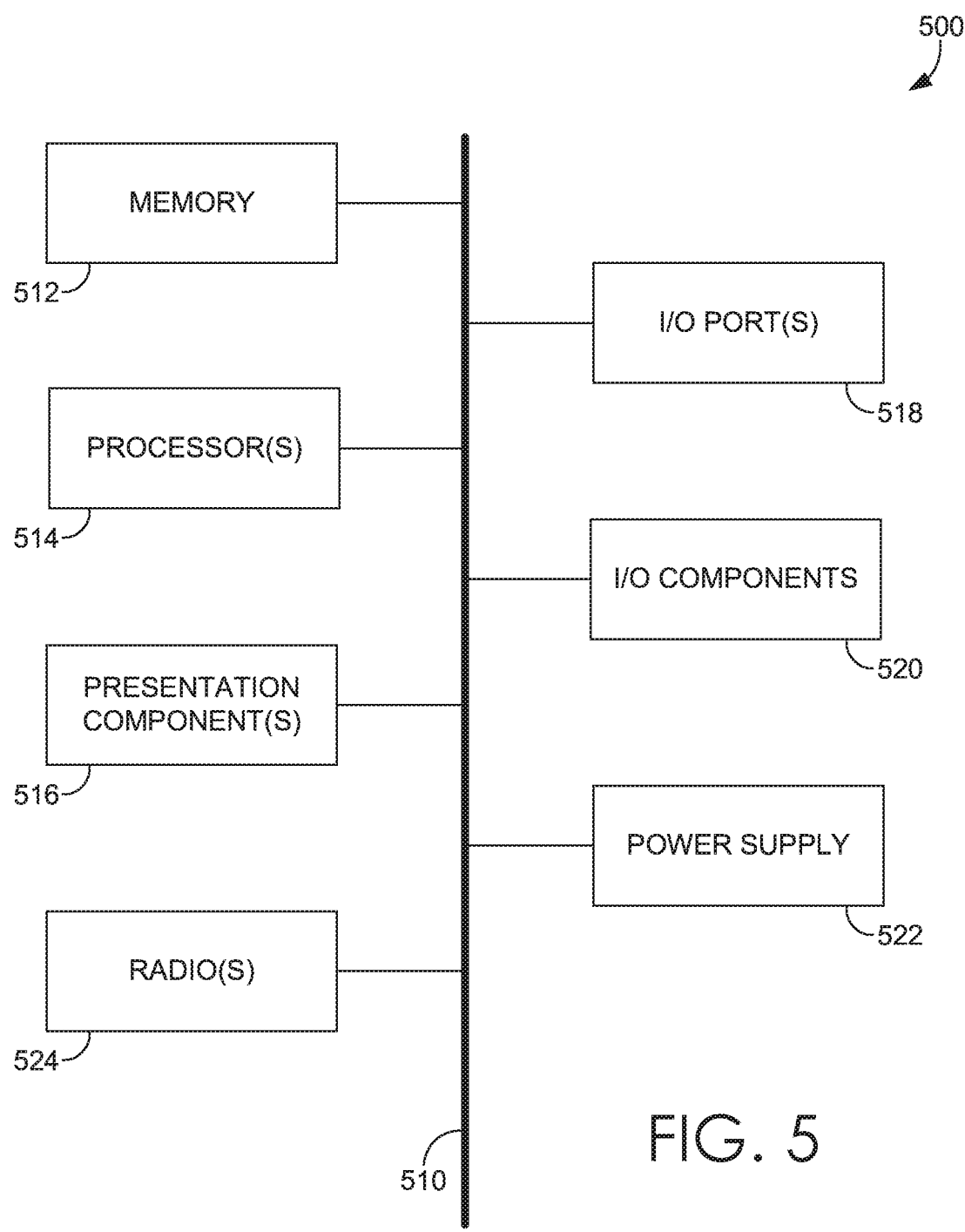

BROADCAST BEAM PROFILE ASSIGNMENT

SUMMARY

The present disclosure is directed, in part, to assigning a broadcast beam profile to a particular cell site based on one of a number of factors. In aspects, these factors may include an elevation of the cell site, a height of the cell site, an elevation of multiple user devices within the coverage area of the cell site, or a quantity of user devices within the coverage area of the cell site that are above a predetermined elevation. Assigning a broadcast beam profile to a cell site, and in particular a cell site at a higher elevation, allows the antennas to tailor their beam forms (e.g., beam width of horizontal and/or vertical beams) to meet the needs of the user devices in the coverage area. In some instances, the antennas at the cell site are capable of beam forming, including multiple-input and multiple-output (MIMO) or massive-MIMO.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIG. 5 depicts an exemplary computing environment suitable for use in implementation of the present disclosure.

DETAILED DESCRIPTION

Figure 1:
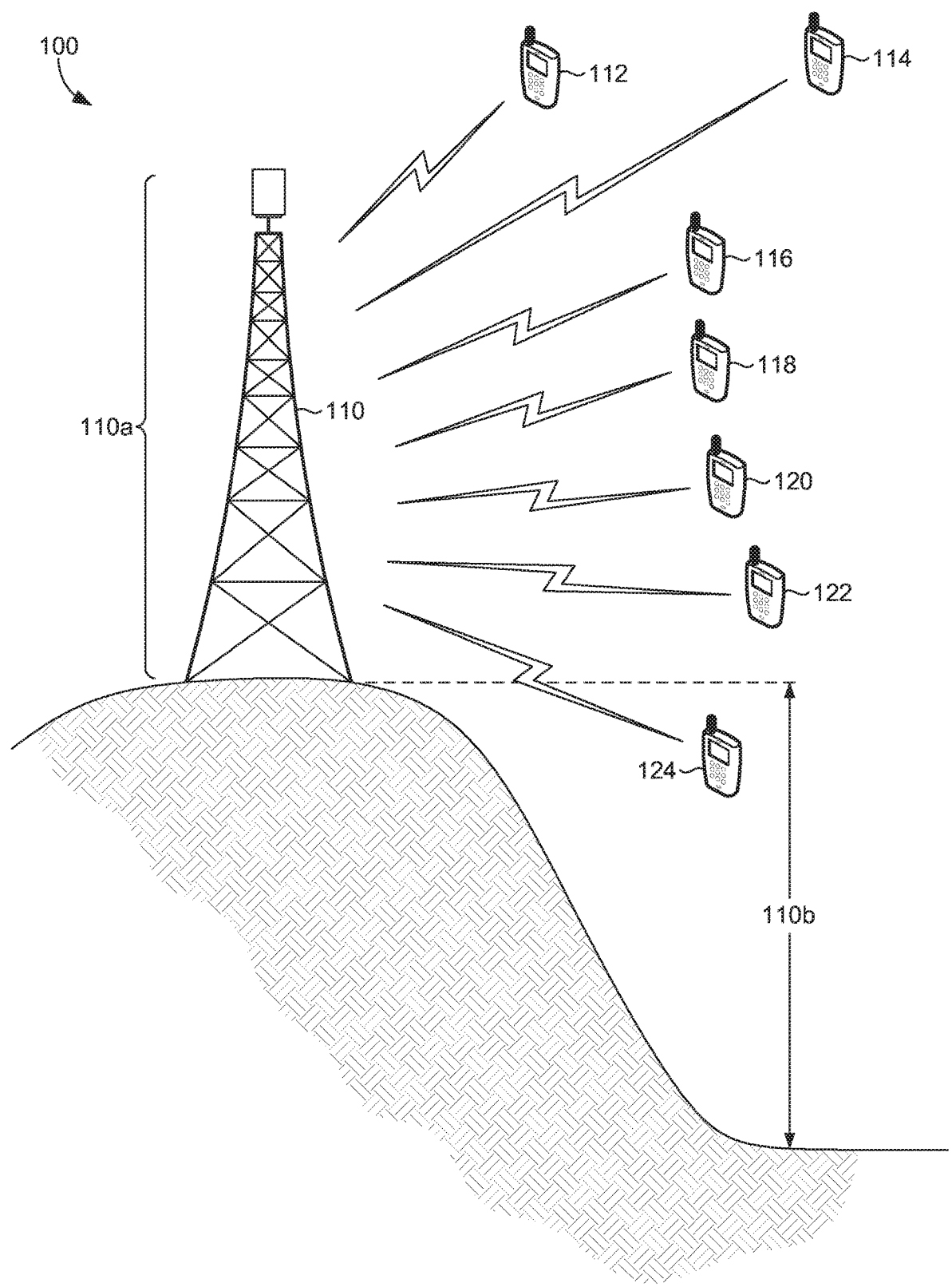
FIG. 1 depicts a diagram of an exemplary network environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

By way of background, a traditional telecommunications network employs a plurality of cell sites (e.g., base stations, cell towers) to provide network coverage. Cell sites are employed to broadcast and transmit transmissions to user devices of the telecommunications network. Cell sites include one or more antennas, where, in some instances, the one or more antennas are capable of beamforming. Beamforming is conventionally employed to provide a directional data transmission to a specific user device, so that data on a traffic channel or data plane can be sent to that specific user device. In other words, beamforming is a traffic-signaling system for cellular base stations that identifies the most efficient data delivery route to a particular user device, reducing interference for nearby users. For more recently-deployed radio technologies, beamforming can help massive-MIMO arrays, which are base stations arrayed with many individual arrays. Massive-MIMO, or M-MIMO, groups together antennas at the transmitter and receiver to provide better throughput and better spectrum efficiency than its predecessor, MIMO.

Aspects herein take into account various factors, including one or more of a height of a cell tower, an elevation of a cell tower, an elevation of user devices within a predetermined proximity to the cell tower, a quantity of user devices above a predetermined elevation, etc., to determine a broadcast beam profile for that particular cell tower.

Typically, the assignment of broadcast beam profiles is a static determination, including the assignment not being based on anything related to a particular cell site (e.g., height, elevation). But here, the assignment of broadcast beam profiles is a dynamic determination, as it is based on one or more factors associated with the particular cell site. In aspects herein, the broadcast beam profile includes information corresponding to one or more of a vertical beam width or a horizontal beam width that the antennas at the cell site are to use. For example, the elevation of a particular cell site could have an impact on what the optical vertical and/or horizontal beam width would be from that cell site. In some instances, a higher elevation of a cell site would warrant the horizontal beam width to be narrower than the horizontal beam width emitted from a cell site at a lower elevation. Similarly, the quantity of user devices above a particular elevation that are in the coverage area of a cell site could impact the horizontal and/or vertical beam width from that cell site.

In a first aspect, one or more computer-readable media having computer-executable instructions embodied thereon are provided that, when executed, perform a method for assigning a broadcast beam profile to a particular cell site. The method includes determining one or more of an elevation associated with a cell site, a height associated with the cell site, or an elevation associated with one or more user devices that are positioned within a predetermined vicinity of the cell site. In aspects, the antennas associated with the cell site are capable of beamforming. The method also includes, based on the determining, assigning a broadcast beam profile to the cell site, and, based on the assigned broadcast beam profile, adjusting at least one of a horizontal beam width or a vertical beam width of at least one antenna at the cell site.

In a second aspect, a method is provided for assigning a broadcast beam profile to a particular cell site. The method comprises determining an elevation associated with a cell site, a height associated with the cell site, and an elevation associated with one or more user devices that are positioned within a predetermined vicinity of the cell site. The antennas associated with the cell site may be capable of beamforming. Further, based on the determining step, a broadcast beam profile is assigned to the cell site. Based on the identified broadcast beam profile, a horizontal beam width and a vertical beam width of at least one antenna at the cell site are adjusted.

In a third aspect, a system is provided for assigning a broadcast beam profile to a particular cell site. The system includes a processor and one or more computer storage hardware devices storing computer-usable instructions that, when used by the processor, cause the processor to perform a method. These steps include, for a cell site having beamforming-capable antennas, determining an elevation of a cell site, a height of the cell site, and an elevation of one or more user devices within a coverage area of the cell site. Further, the method includes determining a broadcast beam profile for the cell site and applying a horizontal beam width and a vertical beam width at the cell site according to the broadcast beam profile.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention.

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 1, an exemplary network environment is provided in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

FIG. 1 illustrates a cell site 110 having a height 110a and an elevation 110b. Cell sites, such as cell site 110 may be located at different elevations, and here, is located above sea level at elevation 110b. While the elevation of cell site 110 is illustrated in FIG. 1 as being at the bottom of cell site 110, the elevation may be measured from any part of cell site 110, such as at or near the top, at the eNodeB or gNodeB, at the base station, or the like. Cell site 110 is in communication with user devices 112, 114, 116, 118, 120, 122, and 124. Each user device illustrated in FIG. 1 has an elevation, and each includes a communication link to the cell site. In some instances, multiple communication links (not shown) may be required for devices capable of communicating with multiple radio access technologies (e.g., 4G and 5G). Communications links, such as the wireless telecommunication links shown in FIG. 1 between each of the user devices and the cell site 110, may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short-range and long-range as different categories, or types, of connections (i.e., a primary connection and a secondary connection). A short-range connection may include a Wi-Fi connection to a device (e.g., mobile hotspot) that provides access to a communications network, such as a WLAN connection using 802.11 protocol. A short-range connection may also utilize mobile broadband, which provides wireless Internet access using a mobile broadband router. One example of mobile broadband technology is Evolution Data Optimized, or EVDO. EVDO relies on a signal from a wireless tower rather than a physical connection like a phone line or cable. An ENDO modem receives the signal and allows a user to connect to the Internet. Another example of mobile broadband is HSPA. A long-range connection may include a connection using one or more of CDMA, GPRS, GSM, TDMA, 802.16, and the like.

In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices. In some aspects, user devices 112, 114, 116, 118, 120, 122, and 124 can correspond to computing device 500 in FIG. 5. Thus, a user device can include, for example, a display(s), a power source(s) (e.g., a battery), a data store(s), a speaker(s), memory, a buffer(s), a radio(s), and the like. In some implementations, user devices 112, 114, 116, 118, 120, 122, and 124 comprise a wireless or mobile device with which a wireless telecommunication network(s) can be utilized for communication (e.g., voice and/or data communication). In this regard, the user device can be any mobile computing device that communicates by way of a wireless network, for example, 3G, 4G, 5G, LTE, CDMA, or any other type of network.

The radio (not shown) of a cell site may include multiple antennas (not shown), which may be capable of beamforming. In some cases, massive-MIMO (M-MIMO) is used at the cell site 110. M-MIMO provides cell sites (e.g., base stations) with a high number of transmit and receive streams to improve peak downlink throughput, substantially improve uplink performance, and enhance coverage, particularly in densely populated environments. As such, cell site 110 may comprise a quantity of antennas, this quantity being capable of beamforming such that M-MIMO can be utilized at cell site 110.

As mentioned above, each user device in FIG. 1 has an elevation that can be determined by cell site 110 or some other network component. Alternatively, each user device knows its elevation and can communicate this to cell site 110. In aspects, a broadcast beam profile is assigned based, at least in part, on the elevation of user devices within the coverage area of cell site 110. For instance, if a predetermined quantity of user devices have elevations above a certain threshold, one broadcast beam profile may be assigned to cell site 110 instead of another.

Figure 2B:
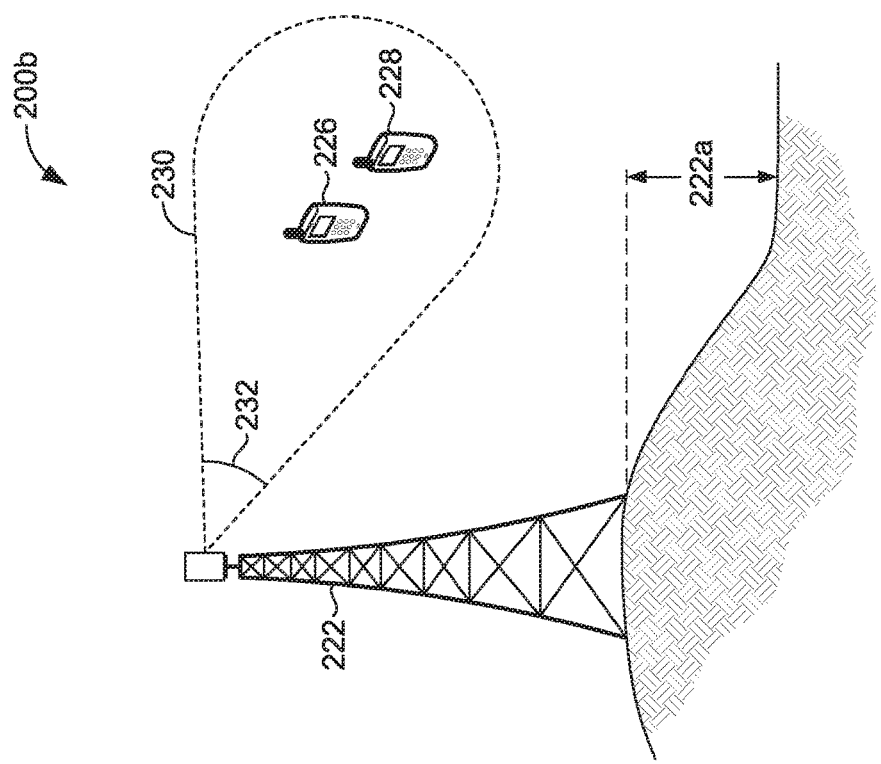
FIG. 2B depicts a diagram of a cell site and user devices at particular elevations, in accordance with aspects of the present disclosure.
Figure 2A:
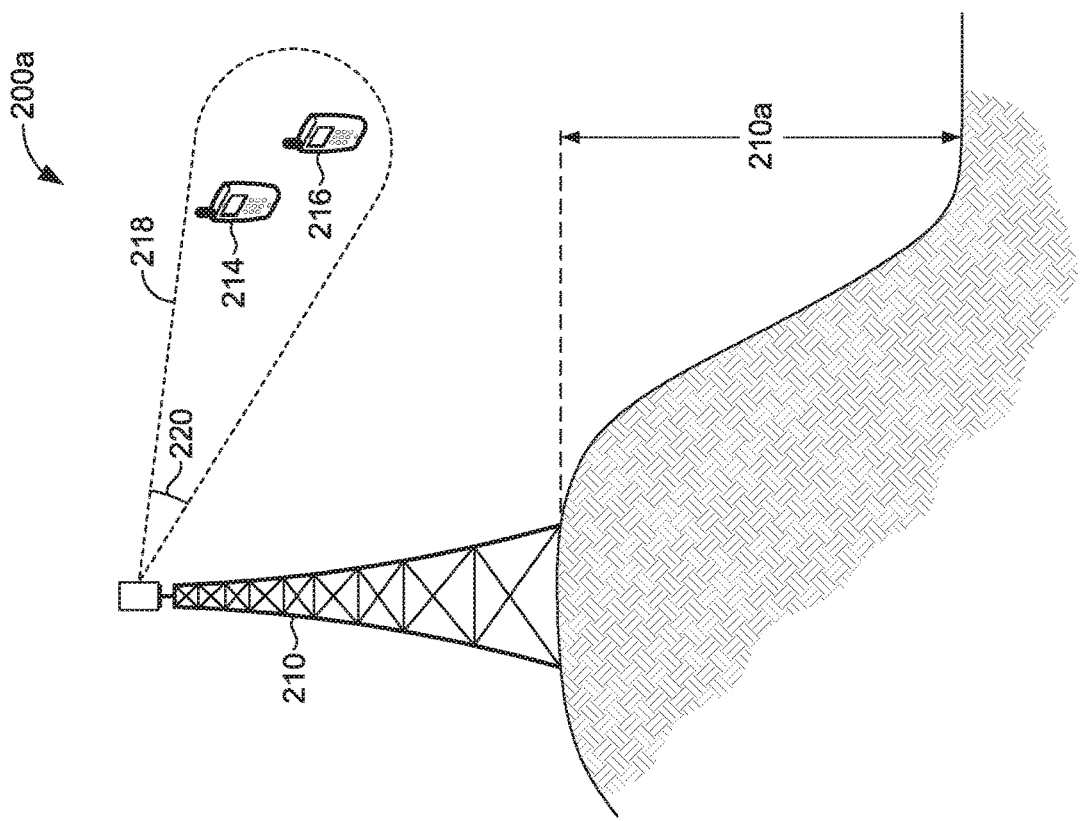
FIG. 2A depicts a diagram of a cell site and user devices at particular elevations, in accordance with aspects of the present disclosure.

Turning now to FIGS. 2A and 2B, another exemplary networking environment suitable for use in aspects discussed herein is provided. Such network environments are illustrated and designated generally as network environments 200a and 200b. Network environments 200a and 200b are but two examples of a suitable network environment and is not intended to suggest any limitation as to the scope of use or functionality of the invention. Neither should the network environments be interpreted as having any dependency or requirement relating to any one or combination of components illustrated.

Network environment 200a includes cell site 210 having a height and an elevation 210a, broadcast beam 218 having a width 220, and user devices 214 and 216. Network environment 200b includes cell site 222 having a height and an elevation 222a, broadcast beam 230 having a width 232, and user devices 226 and 228. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices.

In some aspects, the user devices shown in FIG. 2 can correspond to computing device 500 in FIG. 5. Thus, a user device can include, for example, a display(s), a power source(s) (e.g., a battery), a data store(s), a speaker(s), memory, a buffer(s), a radio(s), and the like. In some implementations, the user devices shown in FIG. 2 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

As shown, the elevation 210a of cell site 210 of FIG. 2A is higher than the elevation 222a of cell site 222 of FIG. 2B. In aspects, this could cause the beam width/angle 220 of broadcast beam 218 to be narrower than the beam width/angle 232 of broadcast beam 230. Higher elevations are typically covered more by the vertical beam width than at lower elevations. For example, at ground level, wider (e.g., horizontal) coverage is typically needed more than vertical coverage, but at a higher elevation, vertical coverage is needed more than horizontal coverage. As such, at cell site 210, having a higher elevation than cell site 222, the vertical beam width, in some cases, would be greater than the horizontal beam width to accommodate the user devices at differing elevations.

Figure 3:
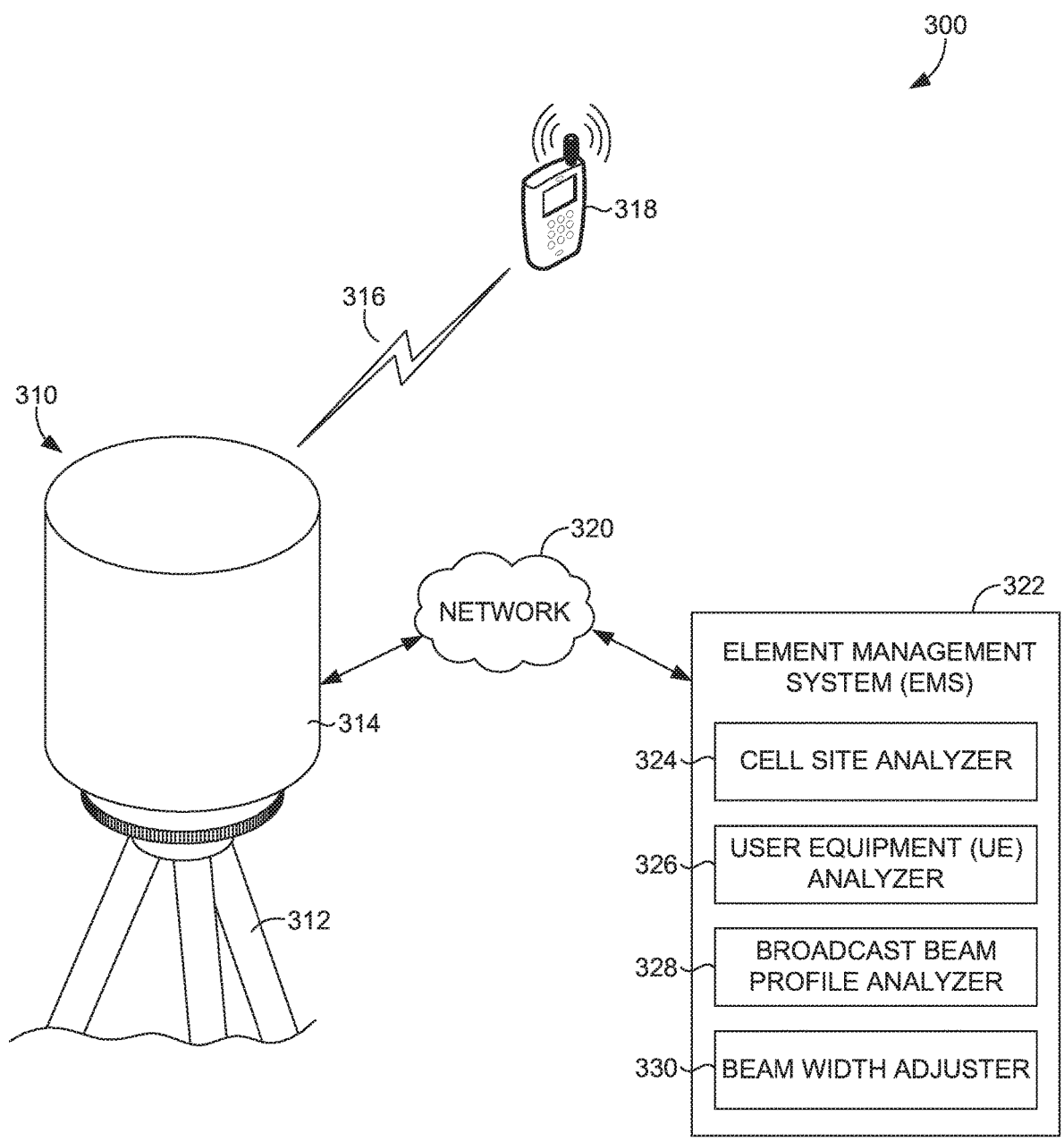
FIG. 3 depicts a diagram of a cell site in communication with an element management system and a user device, in accordance with aspects of the present disclosure.

Turning now to FIG. 3, FIG. 3 depicts a diagram of a cell site in communication with an element management system and a user device, in accordance with aspects of the present disclosure. Cell site 310 (a portion thereof is illustrated in FIG. 3) is shown as being in communication with network 320 and user device 318 (by way of communication link 316). In particular, cell site 310 may be in communication, by way of network 320, with element management system (EMS) 322, which includes various components including cell site analyzer 324, user equipment (UE) analyzer 326, broadcast beam profile analyzer 328, and beam width adjuster 330.

Initially, cell site analyzer 324 is responsible for retrieving and analyzing information associated with cell site 310, which may include a height of cell site 310 and an elevation of cell site. This information could be predetermined and stored in a network component for future retrieval, as needed. The UE analyzer 326 is responsible for determining and analyzing certain information associated with the user devices. In some aspects, this information may include elevation information for one or more user devices within a service/coverage are of cell site 310. The elevation of these user devices, in aspects, impacts the broadcast beam profile assigned to the cell site 310. Even more, in some aspects, the UE analyzer 326 analyzes the quantity of user devices whose elevations are above a certain threshold. The threshold of a quantity of devices and the elevation threshold may be predetermined, such as set by a network operator, or may be dynamically modifiable on a periodic basis.

The broadcast beam profile analyzer 328 is generally responsible for using the information from the cell site analyzer 324 and the UE analyzer 326 to determine which broadcast beam profile should be assigned to the cell site 310. As mentioned above, the broadcast beam profile includes a horizontal and/or vertical beam width (e.g., angle, degree of beam widths (e.g., 45, 60, 90)) to be used by the antennas at the cell site 310. Other information may also be included in the broadcast beam profile. One of multiple broadcast beam profiles may be selected for a particular cell site based on the information from the cell site analyzer 324 and the UE analyzer 326. Logic within the broadcast beam profile analyzer 328 uses this information to select the broadcast beam profile that is the best fit for the particular cell tower. The beam width adjuster 330 then makes the actual adjustment to the antennas to broadcast beams at the beam widths provided for in the selected broadcast beam profile for cell site 310. Alternatively, the beam width adjuster 330 communicates the broadcast beam profile information to cell site 310 (e.g., enodeB, gnodeB), Which then makes the adjustments as necessary.

Figure 4:
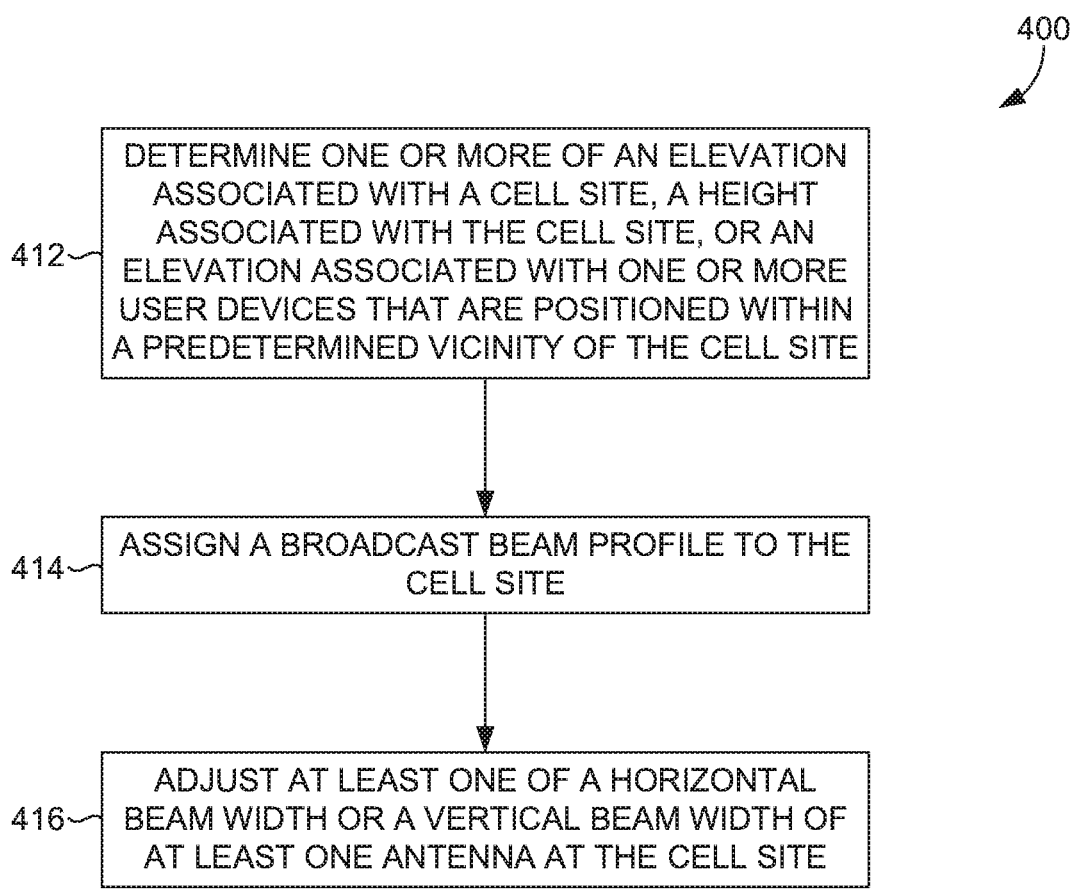
FIG. 4 depicts a flow diagram of an exemplary method for assigning a broadcast beam profile to a particular cell site, in accordance with implementations of the present disclosure.

FIG. 4 depicts a flow diagram of an exemplary method 400 for assigning a. broadcast beam profile to a particular cell site. In aspects, the broadcast beam profile comprises a direction in which the broadcast beam is to be transmitted. This, for instance, may include a phase and amplitude. Shown at block 412, one or more of an elevation associated with a cell site, a height associated with the cell site, or an elevation associated with user devices positioned within a predetermined vicinity of the cell site are determined. In some aspects, a quantity of user devices within the predetermined vicinity of the cell site (e.g., a coverage area of the cell site) and that are positioned higher than a predetermined elevation is determined. This factor may also be used in determined which broadcast beam profile is most suitable for the cell site. At block 414, a broadcast beam profile is assigned to the cell site based on the information determined at block 412. At block 416, at least one of a horizontal or vertical beam width is adjusted for an antenna(s) at the cell site. In aspects, the antennas at the cell site are capable of beamforming, further may be capable of MIMO beamforming, and even further may be capable of massive-MIMO beamforming. In some aspects, the broadcast beam profile assigned to the cell site includes both horizontal and vertical beam widths, and as such, both may be adjusted at block 416.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof. Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, perform a method for assigning a broadcast beam profile to a particular cell site, the method comprising:
    determining one or more of an elevation associated with a cell site, a height associated with the cell site, or an elevation associated with one or more user devices that are positioned within a predetermined vicinity of the cell site, wherein antennas associated with the cell site are capable of beamforming;
    based on the determining, assigning a broadcast beam profile to the cell site; and
    based on the assigned broadcast beam profile, adjusting at least one of a horizontal beam width or a vertical beam width of at least one antenna at the cell site.

2. The one or more non-transitory computer-readable media of claim 1, wherein the broadcast beam profile comprises a direction in which a broadcast beam is to be transmitted.

3. The one or more non-transitory computer-readable media of claim 2, wherein the direction in which the broadcast beam is to be transmitted comprises a phase and an amplitude.

4. The one or more non-transitory computer-readable media of claim 1, wherein the beamforming at the cell site utilizes massive-MIMO.

5. The one or more non-transitory computer-readable media of claim 1, wherein both the horizontal beam width and the vertical beam width are adjusted based on the assigned broadcast beam profile.

6. The one or more non-transitory computer-readable media of claim 1, wherein the elevation associated with the cell site, the height associated with the cell site, and the elevation associated with the one or more user devices that are positioned within the predetermined vicinity of the cell site are determined.

7. The one or more non-transitory computer-readable media of claim 1, wherein the adjusting of the at least one of the horizontal beam width or the vertical beam width of the at least one antenna at the cell site further comprises instructing the at least one antenna to apply a horizontal lobe angle or a vertical lobe angle.

8. The one or more non-transitory computer-readable media of claim 1, further comprising determining a quantity of user devices that are within the predetermined vicinity of the cell site and that are positioned higher than a predetermined elevation.

9. A method for assigning a broadcast beam profile to a particular cell site, the method comprising:
    determining an elevation associated with a cell site, a height associated with the cell site, and an elevation associated with one or more user devices that are positioned within a predetermined vicinity of the cell site, wherein antennas associated with the cell site are capable of beamforming;
    based on the determining, assigning a broadcast beam profile to the cell site; and
    based on the identified broadcast beam profile, adjusting a horizontal beam width and a vertical beam width of at least one antenna at the cell site.

10. The one or more computer-readable media of claim 9, wherein the broadcast beam profile comprises a direction in which a broadcast beam is to be transmitted.

11. The one or more computer-readable media of claim 10, wherein the direction in which the broadcast beam is to be transmitted comprises a phase and an amplitude.

12. The one or more computer-readable media of claim 9, wherein the beamforming at the cell site utilizes massive-MIMO.

13. The one or more computer-readable media of claim 9, wherein both the horizontal beam width and the vertical beam width are adjusted based on the assigned broadcast beam profile.

14. The one or more computer-readable media of claim 9, further comprising determining a quantity of user devices that are within the predetermined vicinity of the cell site and that are positioned higher than a predetermined elevation.

15. A system for assigning a broadcast beam profile to a particular cell site, the system comprising:
    a processor; and
    one or more computer storage hardware devices storing computer-usable instructions that, when used by the processor, cause the processor to:
    for a cell site having beamforming-capable antennas, determining an elevation of a cell site, a height of the cell site, and an elevation of one or more user devices within a coverage area of the cell site;
    determining a broadcast beam profile for the cell site; and
    applying a horizontal beam width and a vertical beam width at the cell site according to the broadcast beam profile.

16. The one or more computer-readable media of claim 15, wherein the broadcast beam profile comprises a direction in which a broadcast beam is to be transmitted.

17. The one or more computer-readable media of claim 16, wherein the direction in which the broadcast beam is to be transmitted comprises a phase and an amplitude.

18. The one or more computer-readable media of claim 15, wherein the beamforming-capable antennas utilize massive-MIMO.

19. The one or more computer-readable media of claim 15, further comprising determining a quantity of user devices that are within the predetermined vicinity of the cell site and that are positioned higher than a predetermined elevation.

* * * * *